United States Patent [19]
Shibata

[11] Patent Number: 5,554,925
[45] Date of Patent: Sep. 10, 1996

[54] PULSE DURATION MODULATOR AND PULSE DURATION MODULATION TYPE SWITCHING POWER SOURCE

[75] Inventor: Kimio Shibata, Chiba, Japan

[73] Assignee: Seiko Instruments Inc., Japan

[21] Appl. No.: 347,863

[22] Filed: Dec. 1, 1994

[51] Int. Cl.$^6$ ................................................ H02M 3/335
[52] U.S. Cl. ........................... 323/282; 363/21; 323/222; 323/266
[58] Field of Search ........................... 361/154; 323/222, 323/266, 269, 273, 274, 282, 284, 902, 268, 259, 271, 344, 350; 363/59–61, 21; 307/109–110

[56] References Cited

U.S. PATENT DOCUMENTS

5,237,209  8/1993  Brewer ...................................... 307/110
5,406,471  4/1995  Yamanaka ................................. 363/124

Primary Examiner—Peter S. Wong
Assistant Examiner—Aditya Krishnan
Attorney, Agent, or Firm—Adams & Wilks

[57] ABSTRACT

A switching transistor is arranged for charging a capacitor in response to a positive going transition of a clock signal. The charging time of the capacitor is determined by controlling the charging current in accordance with an input voltage to a transistor coupled to the capacitor. The pulse width of an output signal is dependent upon the charging time of the capacitor. Using the inventive pulse width modulator, by comparing the voltage of a reference voltage source with a divided voltage obtained through feedback of the output of the pulse width modulator, a switching power source is obtained by simply adding circuitry for converting, rectifying and smoothing the output voltage. A variable range of pulse width of up to 1800 times can be obtained. When the circuit is designed using complementary MOS devices, the operating voltage can be under 1V with a consumption current of less than several µA. When the circuit is integrated, the oscillator of the modulator and the oscillator of the electronic system in which the modulator is used can be easily switched, and the oscillators can be synchronized, resulting in a low noise, miniaturized switching power source.

7 Claims, 12 Drawing Sheets

FIG. 2

FIG. 3A  CLK

FIG. 3D  3 CLK

FIG. 3E  4 PWM OUT

PULSE DURATION MODULATOR AND PULSE DURATION MODULATION TYPE SWITCHING POWER SOURCE

BACKGROUND OF THE INVENTION

The present invention relates to a pulse duration modulator and to a low power switching power supply having a pulse duration modulator.

Conventionally, a pulse width or pulse duration modulator in prior art comprises a voltage comparator for producing a ramp wave from an oscillator with a D.C. voltage, and input an analog adjusting means for compensating the device due to the unstable offset voltage of the voltage comparator —to stabilize the starting voltage of the ramp wave.

As mentioned above, the pulse duration modulator requires an oscillating circuit for ramp wave generation, but it is not easy to synchronize this oscillator with the oscillator in the system in which it is used. Therefore, it is difficult to control the pulse wave—the duty ratio—, and the S/N ratio in the system is degraded by the noise generated from the oscillator itself.

Moreover, the conventional circuit used for the analog adjusting means is overly complicated, and it is difficult to decrease current consumption because the voltage comparator current consumption is very high even in a stable state during switching time. Also, special consideration to the IC design of an input differential amplifier in the comparator is required in order to match the characteristics of the transistors.

The object of the invention is to solve the aforementioned problems and therefore to offer a small type switching power source with the desirable characteristics of precise control of pulse duration, low operating voltage, low current consumption and low noise.

SUMMARY OF THE INVENTION

To attain the above object and others, in one aspect, the invention comprises a capacitor, a first circuit for discharging the electric charge of the capacitor according to the potential of a clock signal from an oscillator, a second circuit for starting to charge to the capacitor according to the inverse potential of the clock signal, a third circuit for controlling the current applied to the capacitor according to the input voltage level, a fourth circuit coupled to the capacitor for producing on output at the time when the potential of the capacitor exceeds a certain level of threshold voltage, and a logic gate for receiving as inputs the output from the fourth circuit and a clock signal. The invention further comprises an operational amplifier for comparing the voltage from a resistor divider network which divides the output voltage with the voltage of a reference voltage source and amplifying, and a switching power source circuit element for receiving output of the pulse duration modulator, transferring, rectifying and smoothing voltage.

According to the simplified structure of the present invention, the pulse duration modulator and pulse duration modulation type switching power source have a reduced power consumption because the power is consumed only during the short rising, falling time of the switching pulse and charging time for charging the capacitor. The invention can realize significant miniaturization of a switching power supply since it can integrate the capacitor inside the system.

DETAIL DESCRIPTION OF THE REFERRED EMBODIMENTS

Embodiments of the present invention are described according to the drawings hereunder.

Figure 1:
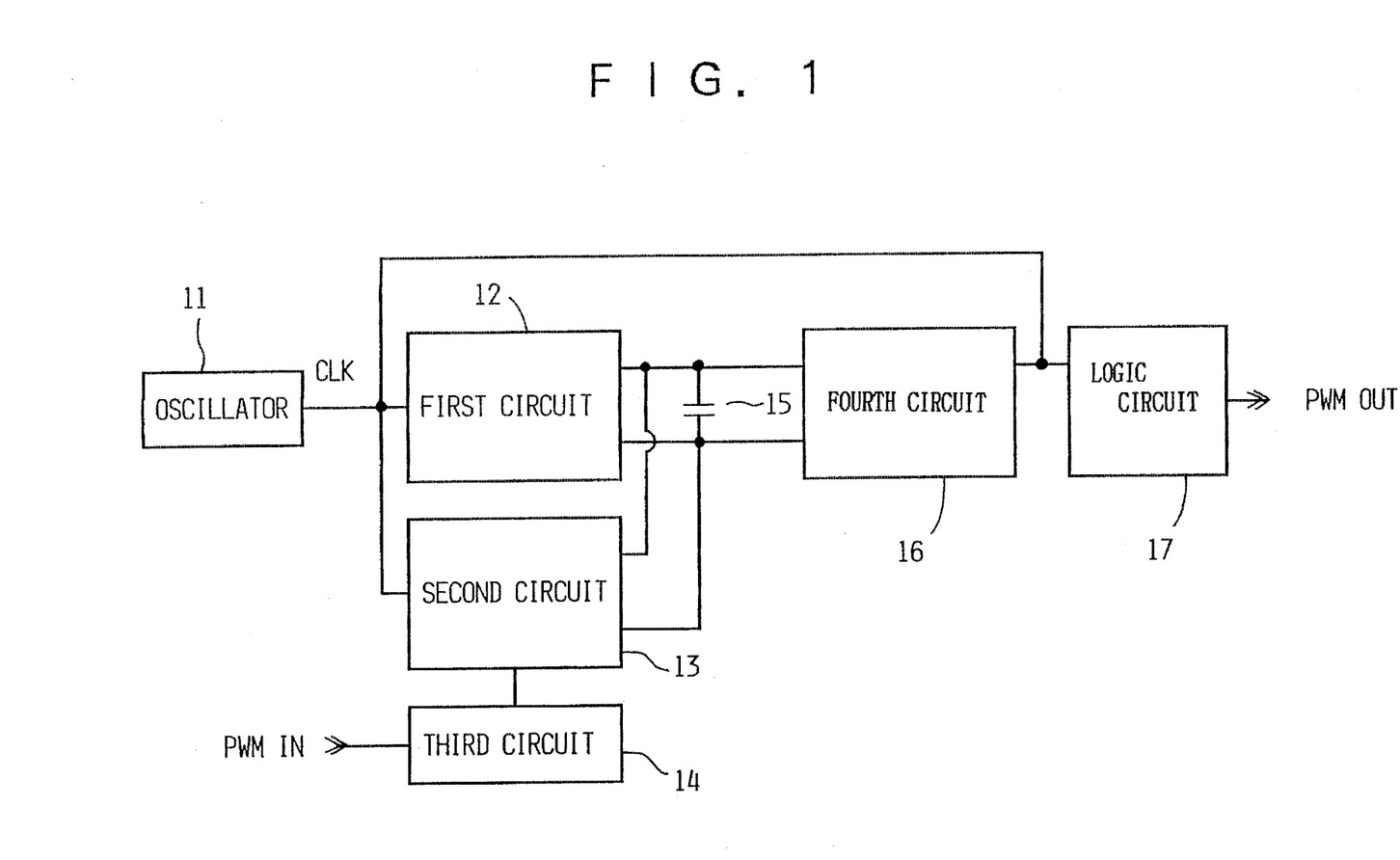
FIG. 1 shows a block diagram of pulse duration modulator in accordance with the present invention.

FIG. 1 shows a block diagram of a pulse duration modulator of the present invention. The oscillator 11 is connected to the first circuit 12 and to the second circuit 13 and the second circuit 13 is connected to the third circuit 14 for receiving a D.C. input —PWM IN—to the pulse duration modulator which serves as the input signal. The capacitor 15 is connected in parallel between terminals of the first circuit 12 and the fourth circuit 16. The output of the fourth circuit 16 is connected to the logic gate 17 and the input of the logic gate 17 is also connected to the oscillator 11. The output of the logic gate 17 serves as the output of the pulse duration modulator—PWM OUT—.

The oscillator 11 can be placed, as mentioned above, inside the pulse duration modulator—referred to as an inner oscillator hereinafter and outside of it, that is, the signal of the oscillator for electronic machine of a total system is applied —referred to as an outside oscillator hereinafter—. Since two kinds of waves, that is, a ramp wave and a rectangular wave are necessary for the pulse duration modulator of the prior art, and moreover since adjustment of a ramp wave voltage is necessary, the generation of a ramp wave by an outside trigger signal i.e., a—clock—makes inside oscillator synchronous in the prior art. But there exists a significant drawback in that the synchronizable frequency range is narrow.

Figures 10, 11:
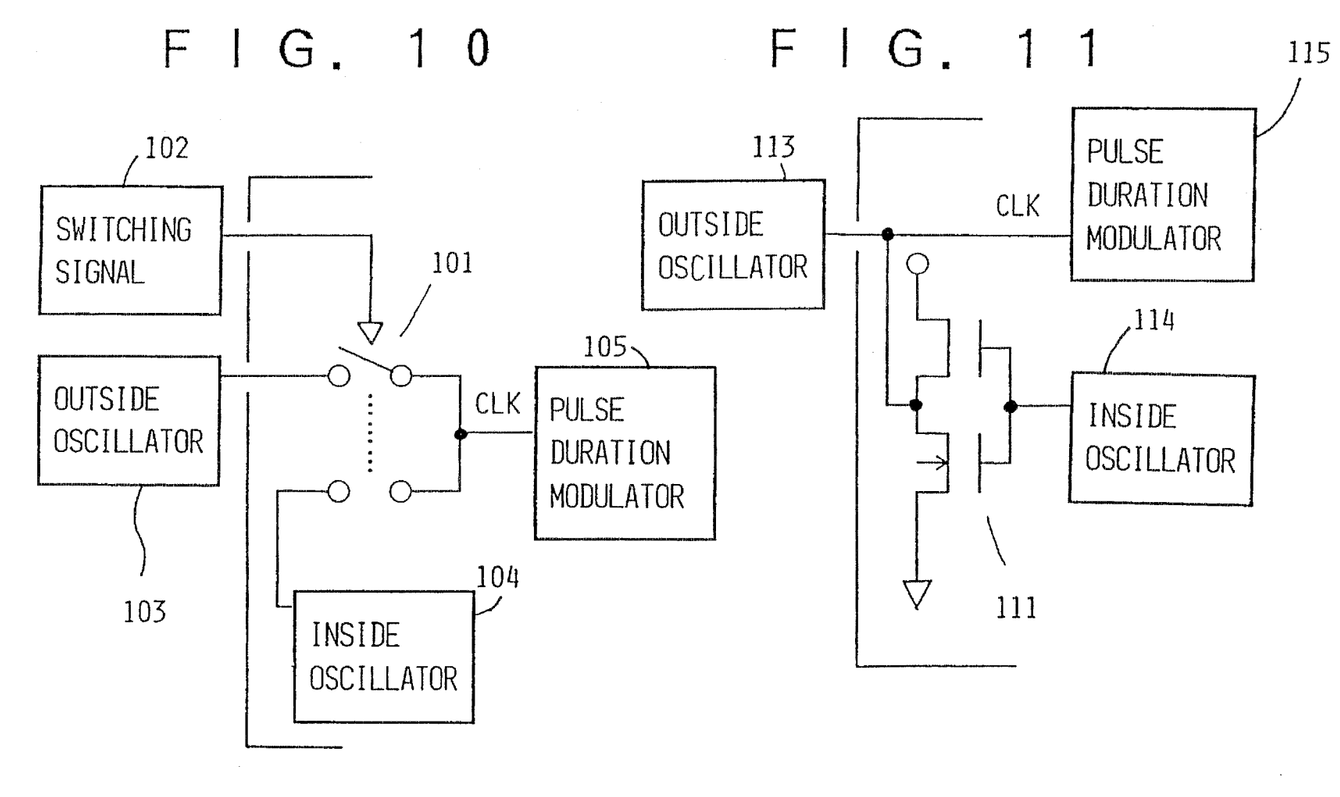
FIG. 10 shows a block diagram of an embodiment for switching an oscillator of pulse duration modulator in the invention.
FIG. 11 shows a block diagram of another embodiment of switching for an oscillator of pulse duration modulation in the invention.

FIG. 10 shows a block diagram of an embodiment for switching of both the inside and outside oscillator. Being selected by the switch 101 according to switching signal 102, either the outside oscillator 103 or the inside oscillator 104 clock signal is sent to the pulse duration modulator 105.

FIG. 11 shows a block diagram of another embodiment for switching between outputs of the outside oscillator 113 and the inside oscillator 114 connected to each other via an inverter 111, such that when the output of the outside oscillator 113 exceeds the output of the inside oscillator 114 the clock signal of the outside oscillator 113 is sent to the pulse duration modulator 115. When the signal from the outside oscillator 113 is stopped, the clock signal of the inside oscillator 114 is sent to the pulse duration modulator.

Figure 2:
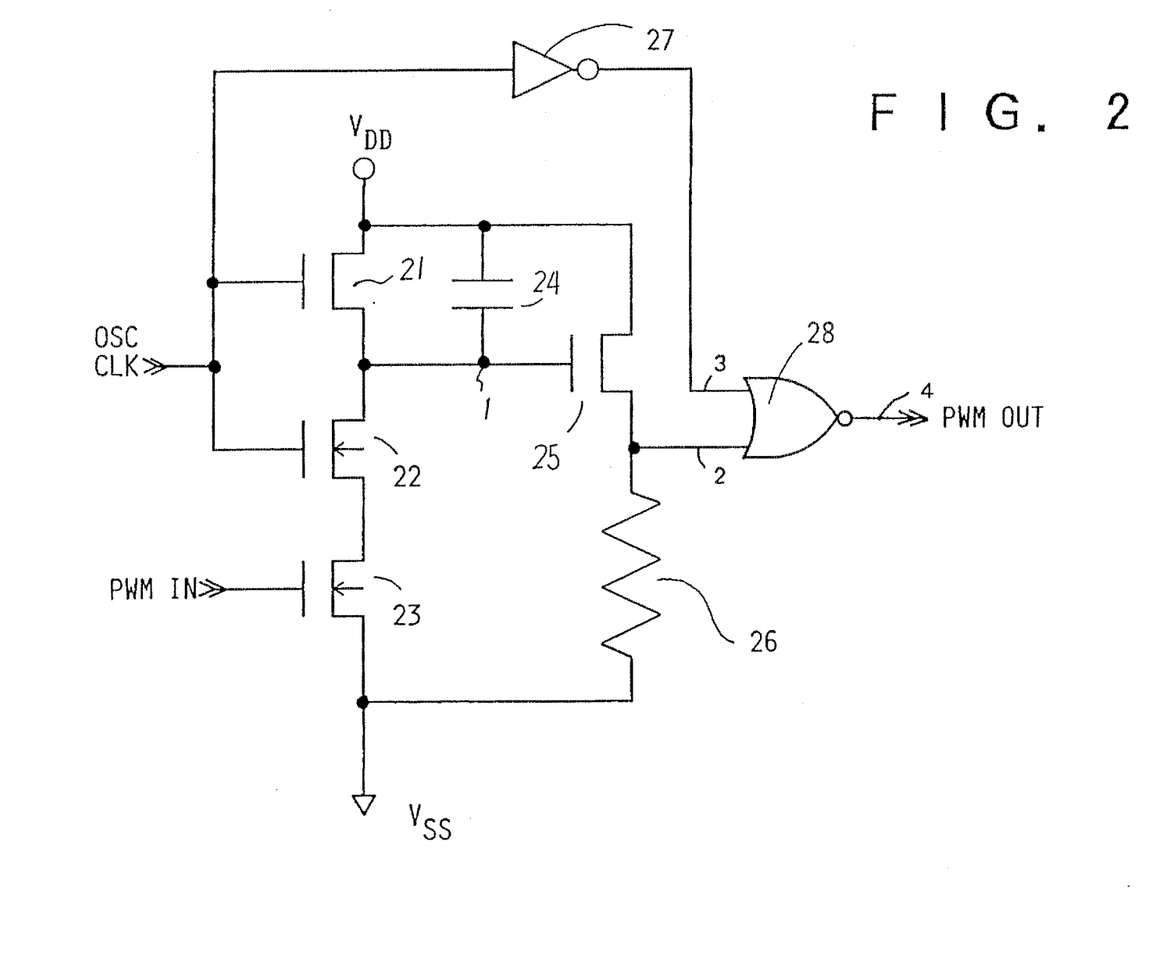
FIG. 2 shows a circuit diagram of pulse duration modulator in accordance with the present invention.

FIG. 2 shows a circuit diagram of a pulse duration modulator of the invention as applied to an operating electronic circuit. P-transistor 21 is applied as the first circuit 12 and N-transistor 22 is applied as the second circuit 13. They are connected as complementary MOS transistor pair in FIG. 2. The capacitor 24 is connected between the output of the complementary NMOS transistor 22 and $V_{DD}$. N-transistor 23 is applied as the third circuit 14 and P-transistor 25 and resistor 26 are applied as the fourth circuit 16. Inverter 27 and NOR circuit 28 are applied as the logic gate 17.

Next, operations of the pulse duration modulator in the invention will be explained hereunder, based on the time chart in FIG. 3 and circuit diagram in FIG. 2. When the OSC CLK (FIG. 3A) which is the output from the transistor 21 in a low impedance state, discharges its electric charge, the voltage 1 (FIG. 3B) of the condenser 24 turns to be $V_{DD}$. Starting from this initiating state, transistor 21 turns OFF and transistor 22 turns ON at the instance when CLK becomes High. When the gate voltage of N-transistor 23 exceeds the threshold voltage, the drain current of the transistor starts to charge to condenser 24 through N-transistor 22. When condenser 24 charged and its voltage exceeds the threshold voltage of transistor 25, transistor 25 turns ON and its output 2 (FIG. 3C) becomes High. When CLK becomes High, the output 3 (FIG. 3D) of inverter 27 turns Low and the output 4 (FIG. 3E) of NOR circuit 28 which receives output 2 and output 3 as inputs becomes the output of the pulse duration modulator—PWM OUT—. Drain current $I_p$ of N-transistor 23 is given in the following formula of voltage between gate and source $V_{GS}$ and transistor size W/L:

when $0 < V_{DS} \leq (V_{GS} - V_T)$ $I_D = K_P(W/L)[(V_{GS} - V_T) - V_{DS}/2]V_{DS}$ when $0 < (V_{GS} - V_T) \leq V_{DS}$ $I_D = K_P(W/L)(V_{GS} - V_T)$ wherein, $V_{DS}$ is the drain-source voltage, $V_T$ is the threshold voltage, $K_P$ is a constant given in the manufacturing process, and W/L is Width/Length of transistor gate. Changing PWM IN voltage level in order to change pulse duration, drain current of transistor 23 changes and then charge current in the capacitor 24 changes. That is, increasing the PWM IN voltage level causes shortening in the charging time of capacitor 24, and then, PWM OUT pulse duration is shortened. Decreasing the PWM IN voltage level causes a lengthening in the pulse duration, and when the PWM IN voltage level decreases under threshold value of transistor 23, the pulse duration takes on an equivalent value to the CLK High duration.

Charging time t of capacitor 24 is as follows;

$t = CV_{TP}/I_D$ where C is condenser capacity and $V_{TP}$ is the threshold voltage of P transistor 25.

Having the structure above, the threshold voltage of transistor 25 can be considered a reference voltage since the gate voltage-drain current characteristics of transistor 25 are stable, and therefore the pulse duration can be accurately controlled.

Realistically realized pulse duration is;

when C=2.5 pF and $V_{TP}$=0.5 V the shortest charging time t=5 nSec when $I_D$ is 250 μA the longest charging time t=5 μSec when $I_D$ is 0.25 μA This means in CLK of FIG. 3 that the ratio of the shortest charging time to the longest charging time becomes 1:1000 when the duty ratio is 50%, and 1:1800 when the duty ratio is 90%. That is to say, 1800 kinds of pulse duration can be controlled stable.

Figure 4:
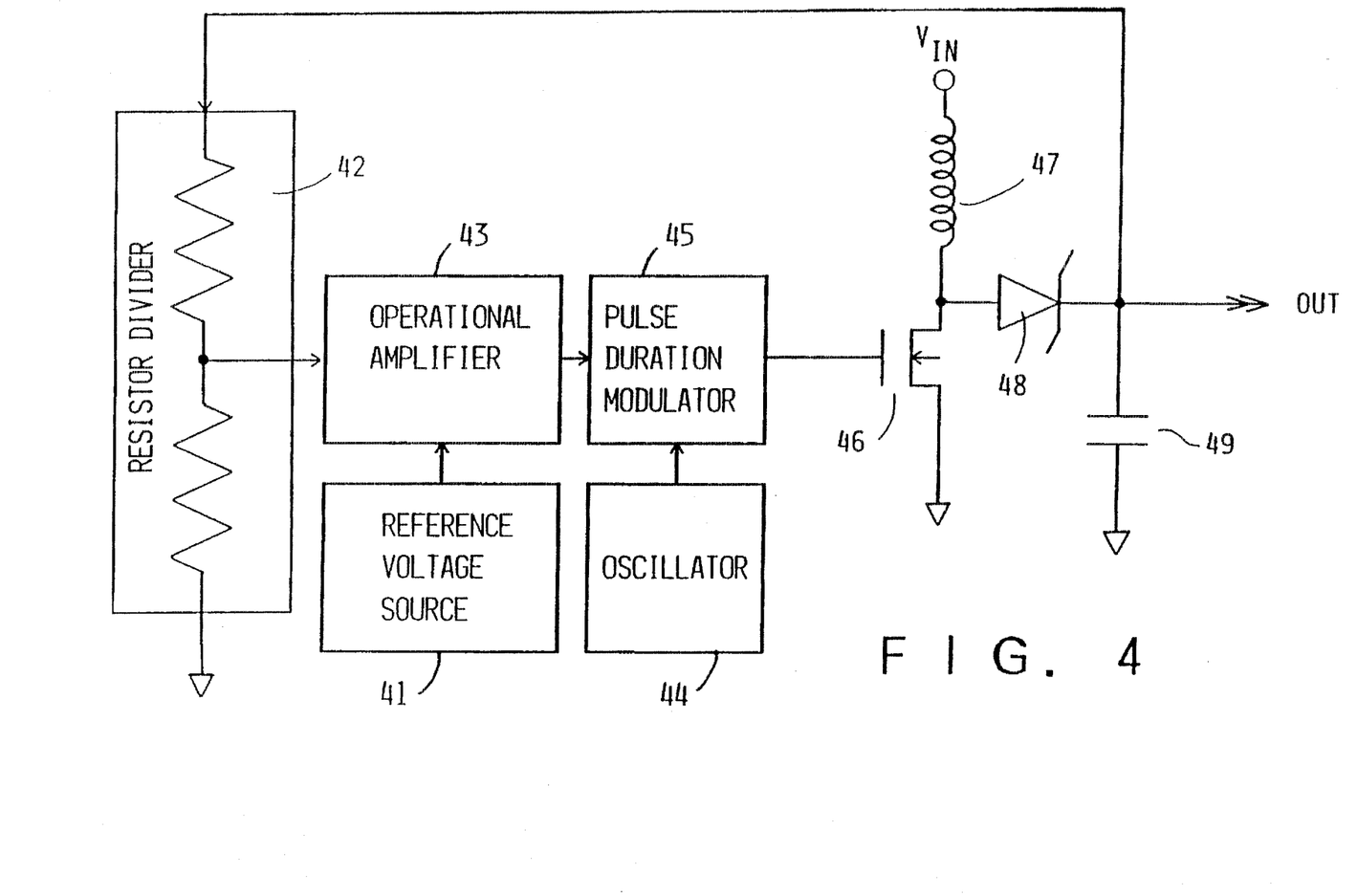
FIG. 4 shows a block diagram of pulse duration modulation type switching power source in accordance with the invention.

Next, the pulse duration modulation type switching power source with the pulse duration modulator above is described hereunder. FIG. 4 shows a block diagram of a switching power source of the invention. A resister divider 42 and a reference voltage source 41 are connected to the input side of an operational amplifier 43 and the output side of the operational amplifier 43 and an oscillator 44 are connected to the input terminals of the pulse duration modulator 45. The output of the pulse duration modulator 45 is connected to the gate of a transistor 46 and a coil 47 is connected between an input terminal of the switching power source and a drain of transistor 46. The drain of transistor 46 is also connected to a first terminal of diode 48, and a second terminal of the diode 48 is connected to the resistor divider 42. Moreover, a first terminal of capacitor 49 is connected to $V_{SS}$, a second terminal of the capacitor 49 is connected to the second terminal of diode 48, and this is the output terminal.

The operation of switching power source in the invention is described hereinafter. The operational amplifier 43 compares the output voltage from the resistor divider 42 which divides the output voltage with the voltage of the reference voltage source 41 and amplifies. The output of the operational amplifier 43 and the output of the oscillator 44 which generates a clock signal determine pulse duration corresponding to the input in the pulse duration modulator 45. The output of the pulse duration modulator 45 is amplified by the transistor 46, rectified by the diode 48 and smoothed by capacitor 49. The structure described above can produce a stable constant voltage with low consumption of current. Concerning an application example, consumption current 10 μA to 20 μA of switching power source is obtained in the invention, compared with that of 1.5 mA to 4.5 mA in the prior art.

Figure 5:
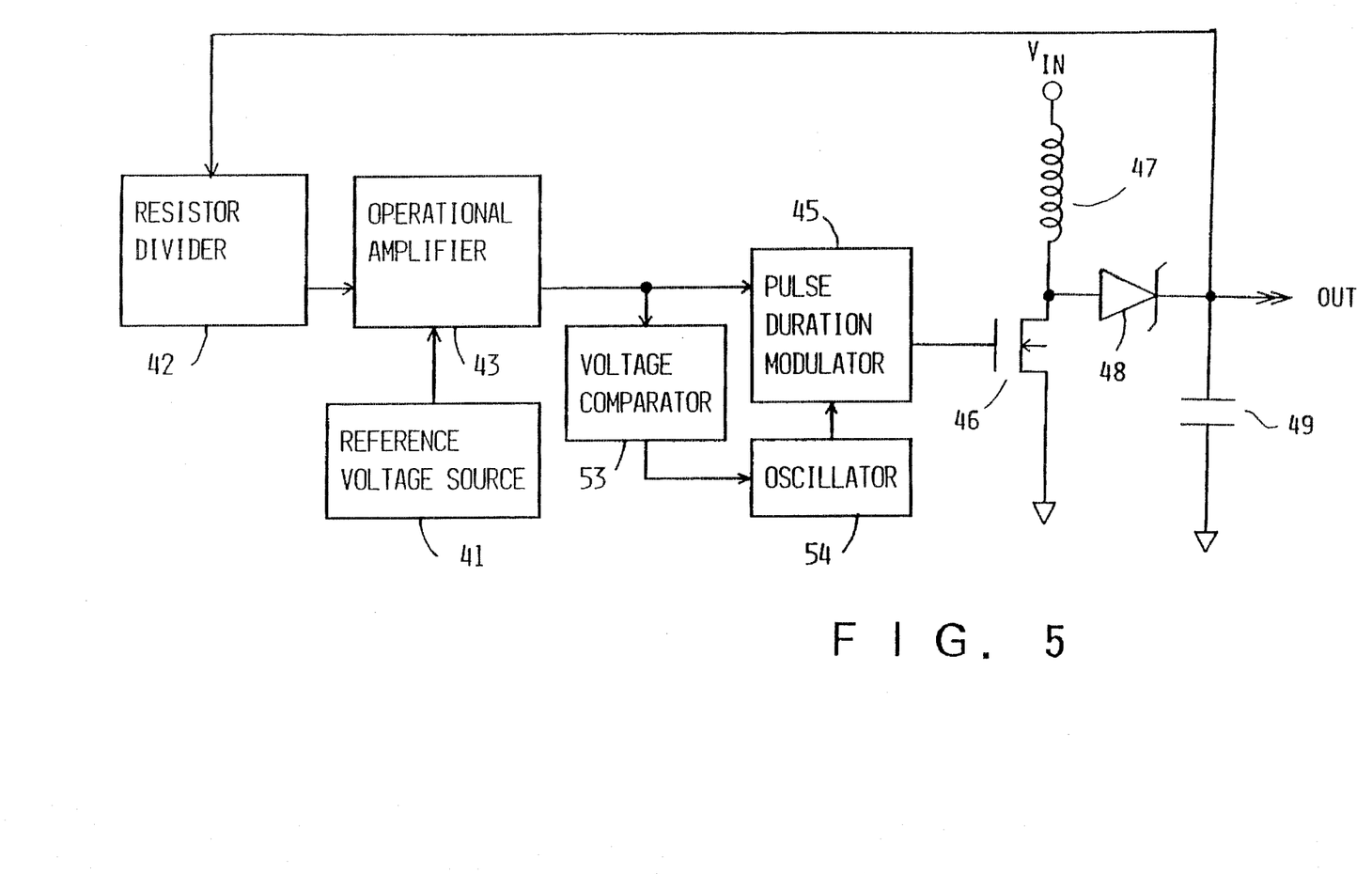
FIG. 5 shows a block diagram of a another embodiment of pulse duration modulation type switching power source in accordance with the invention.

Another embodiment of the switching power source of the present invention is described hereunder, based on FIG. 5. FIG. 5 shows an embodiment in which a voltage comparator 53 is added to the embodiment of FIG. 4, of which the operation for the voltage comparator 53 is to generate inverse output and to halt the oscillation of the oscillator 54 when the output voltage of the operational amplifier 43 boosts. According to the structure, the transfer efficiency of the switching power source is improved, since current consumption of the oscillator 54 and the circuit relevant thereto is decreased at light load. The embodiment is more effective and efficient since low current consumption of the pulse duration modulator can be realized in the invention. Concerning a real application example, current consumption of 2 μA to 4 μA is obtained in the invention.

Figure 6:
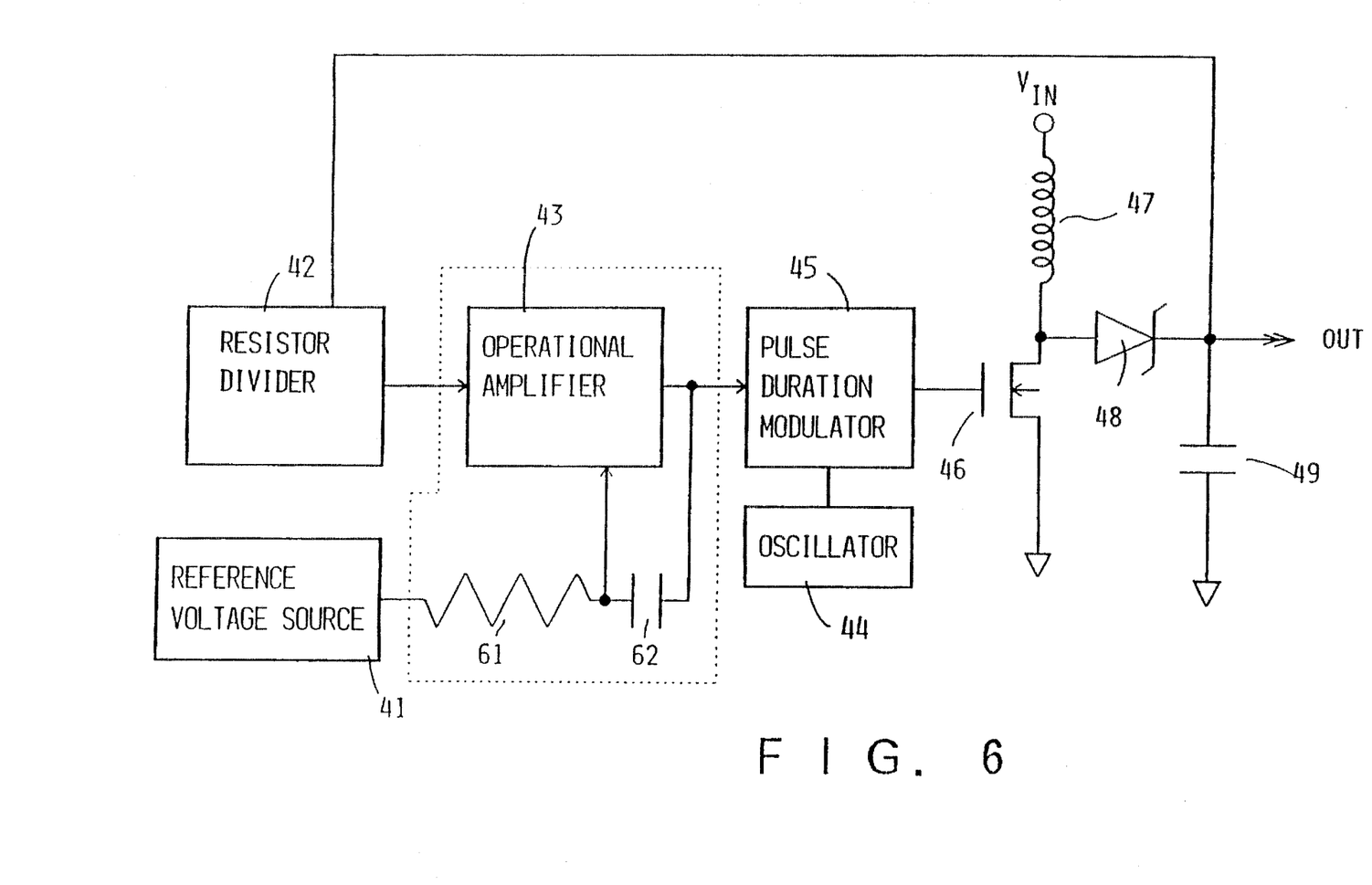
FIG. 6 shows a block diagram of a the other embodiment of pulse duration modulation type switching power source in accordance with the invention.

Next, an embodiment of switching power source in the invention will be explained hereunder based on FIG. 6. FIG. 6 shows the embodiment in FIG. 4 plus a resistor 61 and condenser 62 together with operational amplifier 43, together which constitutes an integrator 63.

Figure 7:
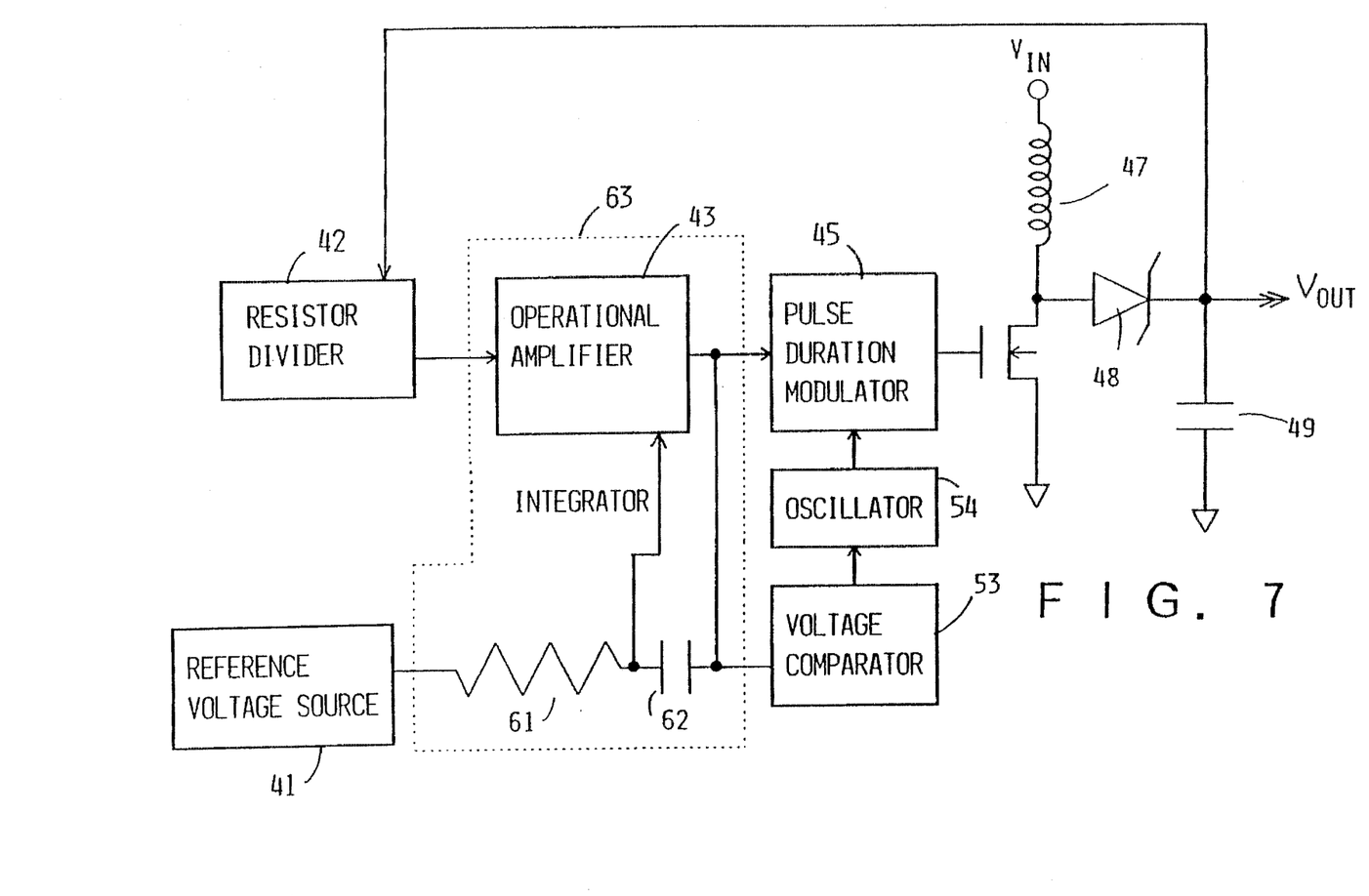
FIG. 7 shows a block diagram of the other embodiment of a pulse duration modulation type switching power source in accordance with the invention.

The embodiment of the switching power source in the invention will be explained hereunder based on FIG. 7. FIG. 7 shows an embodiment with the voltage comparator 53 added to the embodiment of FIG. 6. According to the structure, voltage comparator 53 stops the oscillation of oscillator 54, by obtaining stable output of integrator 63, which can decrease in current consumption at light load.

Figure 8:
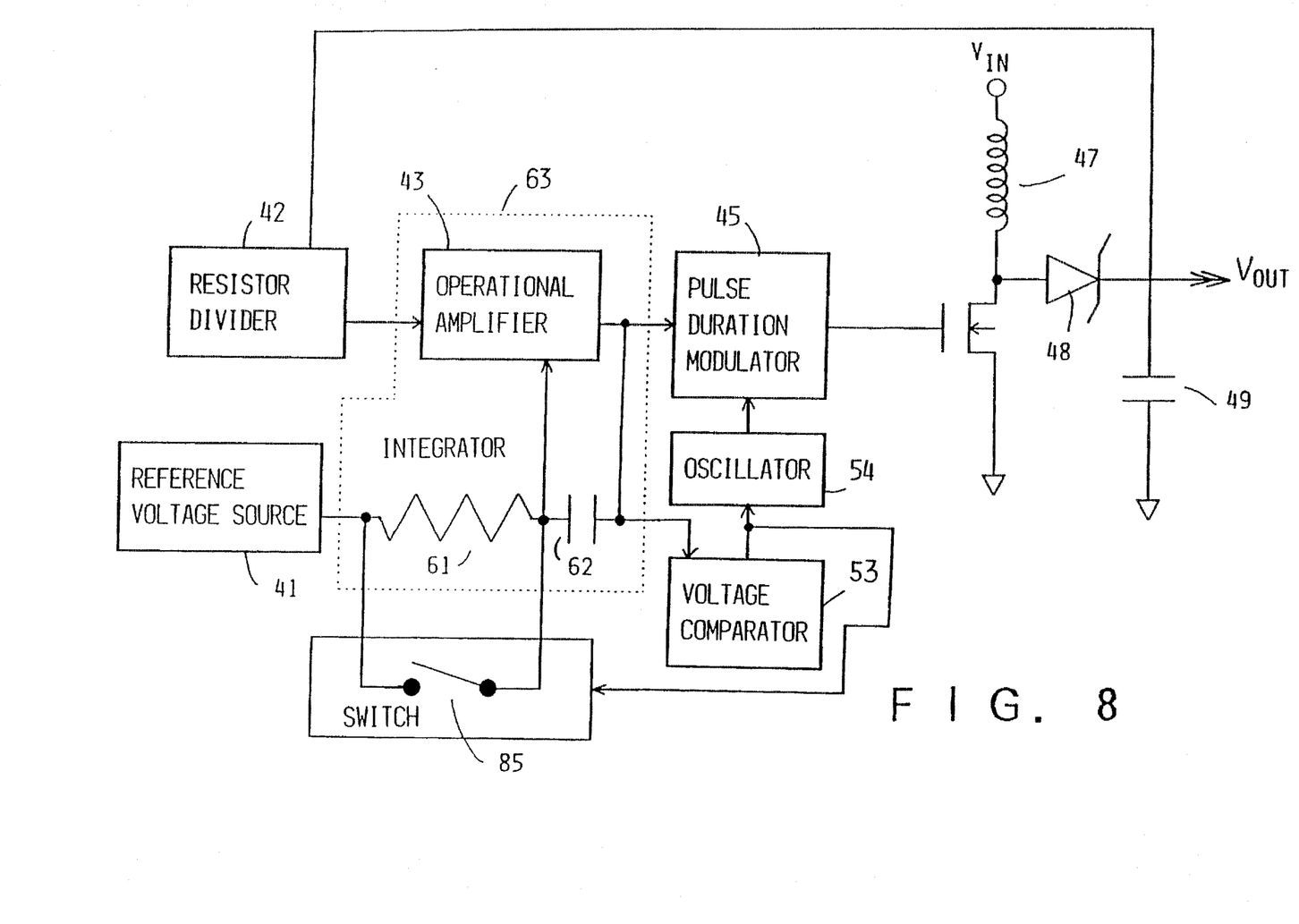
FIG. 8 shows a block diagram of the other embodiment of pulse duration modulation type switching power source in the invention.

Moreover, the embodiment of the switching power source of the invention is described hereunder based on FIG. 8. FIG. 8 shows an embodiment in which a switch 85 is connected in parallel to resistor 61 in FIG. 7. The input terminal for turning ON-OFF the switch 85 is connected to the output of voltage comparator 53. According to this structure the transition response time can be shortened by way of using switch 85 for having smaller integration constant of integrator 64 in order to improve the response characteristic in case that load fluctuation in switching power source happens, and then there is to be returned to the former integration constant after the output of power source returns to be normal.

Figures 3A, 3B:
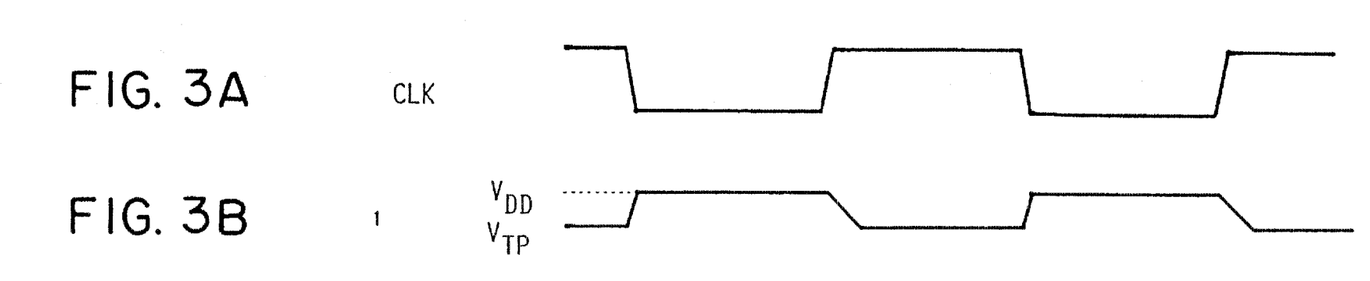
FIGS. 3A–3E are timing diagrams of the circuit illustrated in FIG. 2.
Figure 3C:
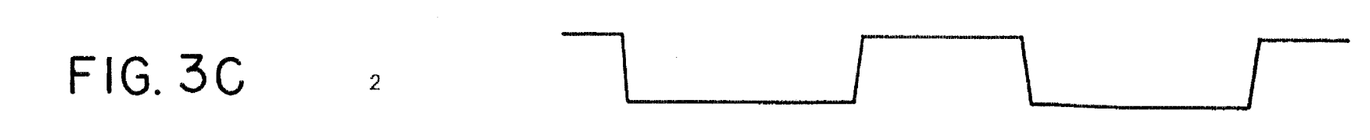
Figure 3D:
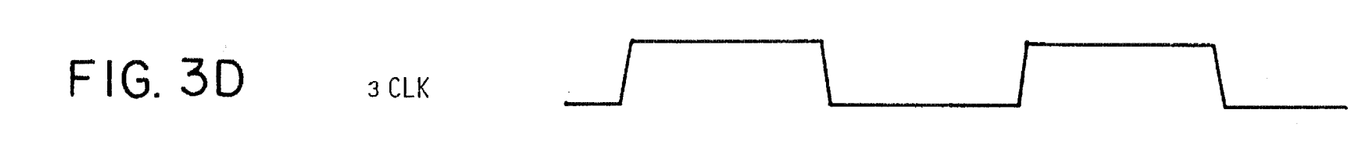
Figure 3E:
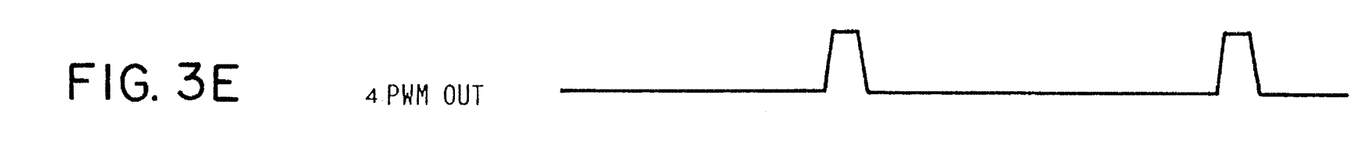
Figure 9:
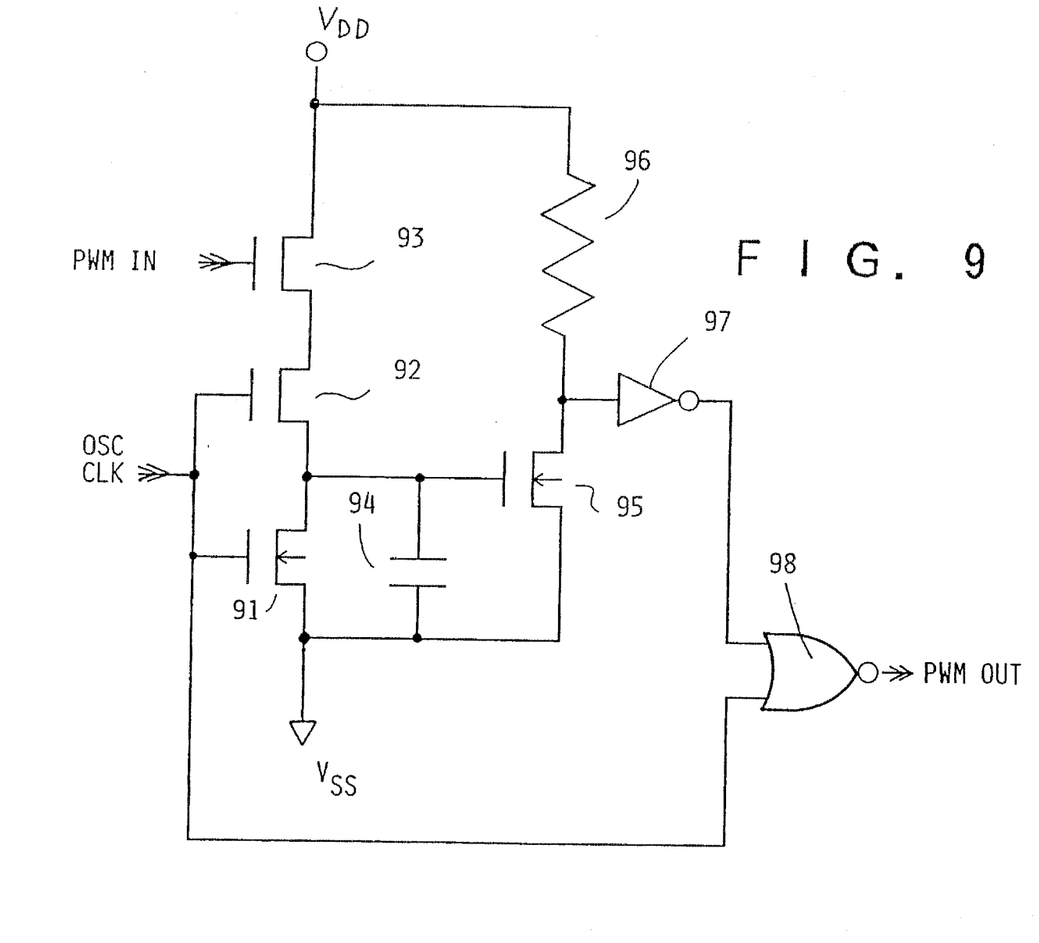
FIG. 9 shows a circuit diagram of another embodiment of pulse duration modulator in the invention.

By the way, although $V_{DD}$ is taken as for reference voltage of condenser 24 in pulse duration modulator of the embodiment in FIG. 2, $V_{SS}$ may be also taken as for that of condenser 94 in FIG. 9. In this case, the input portion of pulse duration modulator is structured with P-transistor 93 and logical output becomes inverse as of FIG. 3. It is also clear that the circuit above described can be totally replaced with a bipolar transistor circuit.

Figure 12:
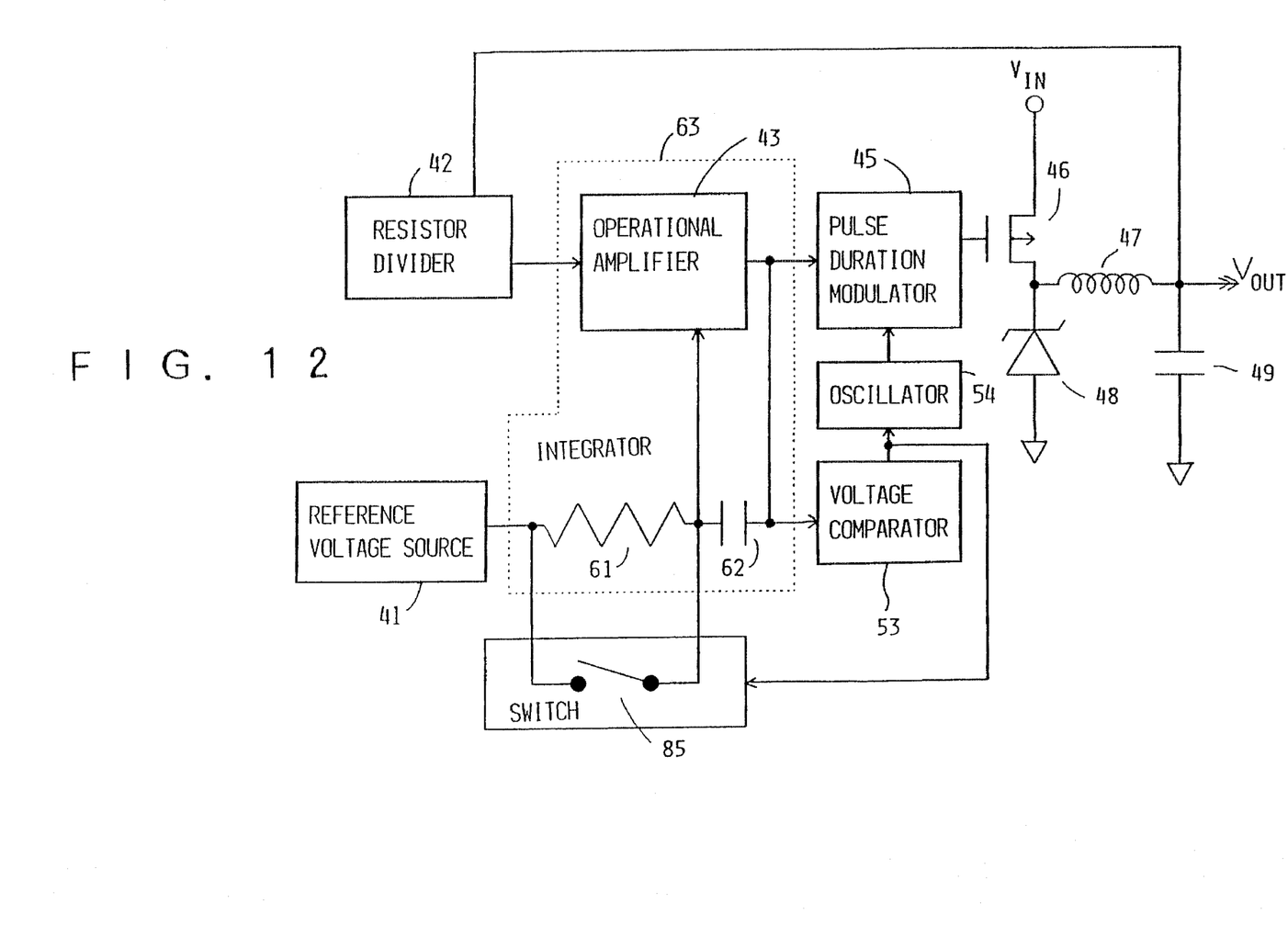
FIG. 12 shows a block diagram of pulse duration modulation type switching power source stepping down type in the invention.
Figure 13:
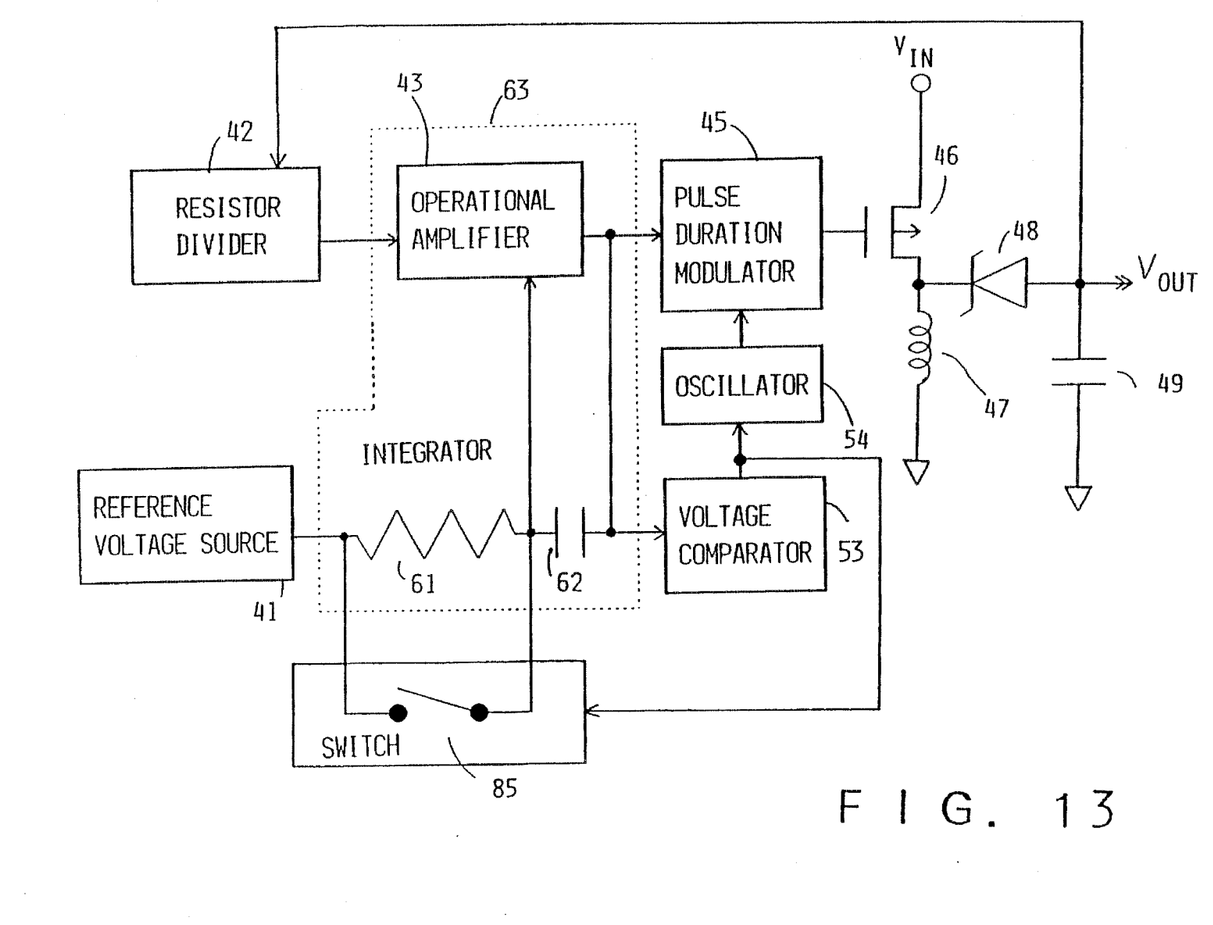
FIG. 13 shows a block diagram of pulse duration modulation type switching power inversion type in the invention.

Although a booster type switching power source is used for an example in the embodiments of FIG. 4 through FIG. 8 for the purpose of explanation, it is clear that stepping down type as shown in FIG. 12 or inversion type as shown in FIG. 13 can also be effective.

As mentioned above, according to the present invention, the variable range of pulse duration can be set stable up to the range of 1800 times as far as the smallest pulse duration, even such a circuit as is designed according to usual way of complementary MOS logic designing can be operational under operating voltage of 1 V and under consumption current of less several μA, which realized low power consumption in the invention. When circuitry utilized is integrated, the switching power source can make synchronous with the oscillator in the system and a low noise, miniaturized switching power source can be realized, since inside oscillator and oscillator in the system of an electronic device can easily be switched each other.

What is claimed is:

1. A pulse duration modulator comprising:
a first circuit for discharging a capacitor according to a first electric potential of a clock signal from an oscillator; a second circuit for charging the capacitor according to a second electric potential of the clock signal; a third circuit for controlling the level of a charge current applied to the capacitor according to the level of an input voltage signal applied thereto; a fourth circuit, coupled to the capacitor, for producing an output signal when the electric potential of the capacitor exceeds a predetermined threshold voltage; and a logic gate for receiving the output signal from the fourth circuit and the clock signal and producing a pulse output signal having a pulse width dependent upon the level of the input signal.

2. A pulse duration modulation type switching power source comprising: a first circuit for discharging a capacitor in accordance with a first voltage level of a clock signal from an oscillator; a second circuit for charging the capacitor in accordance with a second voltage level of the clock signal; a third circuit for controlling the level of a charging current applied to the capacitor in accordance with the level of an input signal; a fourth circuit coupled to the capacitor for producing an output signal when the potential of the capacitor exceeds a predetermined threshold level; a logic gate for receiving the output signal from the fourth circuit and the clock signal and producing a pulse output signal having a pulse width dependent upon the level of the input signal; an operational amplifier for comparing a voltage of a resistor divider which divides the pulse output signal with a reference voltage produced by a reference voltage source and producing an amplified output and a switching circuit for receiving the pulse output signal from the logic gate and rectifying and smoothing the pulse output signal.

3. A pulse duration modulation type switching power source comprising: a first circuit for discharging a first capacitor in accordance with a first voltage level of a clock signal from an oscillator; a second circuit for charging the first capacitor in accordance with a second voltage level of the clock signal; a third circuit for controlling the level of a charging current applied to the first capacitor in accordance with the level of an input signal; a fourth circuit coupled to the first capacitor for producing an output signal when the potential of the first capacitor exceeds a predetermined threshold level; a logic gate for receiving the output signal from the fourth circuit and the clock signal and producing a pulse output signal having a pulse width dependent upon the level of the input signal; an operational amplifier for comparing a voltage of a resistor divider which divides the pulse output signal with a reference voltage produced by a reference voltage source and producing an amplified output; a transistor having a control terminal coupled to an output of the logic gate; a coil and a diode coupled to the transistor and arranged in a way to boost an output of the transistor; and a second capacitor having a first terminal coupled to either of the coil and the diode and having a second terminal coupled to a low voltage supply terminal; wherein the first terminal is also coupled to the resistor divider.

4. A pulse duration modulation type switching power source comprising: an operational amplifier for comparing a voltage of a resistor divider which divides an output voltage with a reference voltage; a pulse duration modulator, coupled to the operational amplifier, for receiving an output of the operational amplifier and a clock signal; and a voltage comparator for producing an output signal and stopping oscillation of an oscillator when the output voltage of the operational amplifier rises.

5. A pulse duration modulation type switching power source according to claim 3; further comprising an integrator comprising a resistor and a third capacitor coupled to the operational amplifier.

6. A pulse duration modulation type switching power source according to claim 5; further comprising a voltage comparator for stopping oscillation of the oscillator in accordance with an output from the integrator.

7. A pulse duration modulation type switching power source according to claim 6; further comprising a switch for selectively changing an integration constant of the integrator in accordance with an output of the voltage comparator.

* * * * *